US012392625B2

(12) United States Patent
Krishnarao et al.

(10) Patent No.: US 12,392,625 B2
(45) Date of Patent: Aug. 19, 2025

(54) PERSONA BASED NAVIGATION AND ROUTE OPTIMIZATION

(71) Applicant: INTERNATIONAL BUSINESS MACHINES CORPORATION, Armonk, NY (US)

(72) Inventors: Sharath Kumar Rudrapatna Krishnarao, Bangalore (IN); Rahul Reddy Ravipally, Bengaluru (IN); Manoj Jahgirdar, Belagavi (IN); Manjula Golla Hosurmath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 17/448,408

(22) Filed: Sep. 22, 2021

(65) Prior Publication Data
US 2023/0087780 A1 Mar. 23, 2023

(51) Int. Cl.
*G01C 21/34* (2006.01)
*G01C 21/36* (2006.01)
*G06F 16/901* (2019.01)
*G06N 20/00* (2019.01)

(52) U.S. Cl.
CPC ..... *G01C 21/3484* (2013.01); *G01C 21/3667* (2013.01); *G06F 16/9024* (2019.01); *G06N 20/00* (2019.01)

(58) Field of Classification Search
CPC ............ G01C 21/3484; G01C 21/3667; G06F 16/9024; G06N 20/00
See application file for complete search history.

(56) References Cited

U.S. PATENT DOCUMENTS

| 7,593,812 B2 | 9/2009 | Obradovich |
| 7,966,282 B2 * | 6/2011 | Pinckney ........... G06Q 30/0601 |
| | | 707/706 |
| 2002/0046084 A1 * | 4/2002 | Steele .................... H04L 67/52 |
| | | 705/14.64 |

(Continued)

FOREIGN PATENT DOCUMENTS

| CN | 101903903 A * 12/2010 ............. G06Q 10/06 |
| CN | 105148461 B * 2/2018 ............. A63B 24/00 |

(Continued)

OTHER PUBLICATIONS

Afyouni, et. al., "Spatial Models for Context-aware Indoor Navigation Systems: A Survey," Journal of Spatial Information Science, Jun. 2012, 40 pages, No. 4, DOI: 10.5311/JOSIS.2012.4.73, Retrieved from the Internet: <URL: https://www.researchgate.net/publication/266054641_Spatial_models_for_context-aware_indoor_navigation_systems_A_survey>.

(Continued)

*Primary Examiner* — Redhwan K Mawari
(74) *Attorney, Agent, or Firm* — Lily Neff

(57) ABSTRACT

A method, computer system, and a computer program product for persona-based navigation is provided. The present invention may include creating a persona. The present invention may include developing a routing system. The present invention may include enabling a user with at least one route option based on the created persona. The present invention may include displaying a selected route.

17 Claims, 6 Drawing Sheets

(56) References Cited

U.S. PATENT DOCUMENTS

| | | | |
|---|---|---|---|
| 2010/0312650 A1* | 12/2010 | Pinckney | G06F 16/9535 |
| | | | 705/14.66 |
| 2011/0130956 A1 | 6/2011 | Tracton | |
| 2018/0211337 A1* | 7/2018 | Ghaddar | G06Q 50/14 |
| 2019/0178671 A1* | 6/2019 | DeLuca | G01C 21/3608 |
| 2019/0186938 A1* | 6/2019 | Pasukonis | G01C 21/3423 |
| 2020/0082457 A1* | 3/2020 | Hagemann | G16H 40/20 |
| 2020/0103238 A1* | 4/2020 | Judka | G01C 21/343 |
| 2020/0217680 A1* | 7/2020 | Dewan | G01C 21/343 |
| 2021/0333114 A1* | 10/2021 | Roggenkamp | G01C 21/3415 |

FOREIGN PATENT DOCUMENTS

| | | | | |
|---|---|---|---|---|
| JP | 2010004320 A | * | 1/2010 | G10L 13/00 |
| KR | 20140025543 A | * | 3/2014 | G01C 21/343 |
| KR | 20190063708 A | | 6/2019 | |
| KR | 20200074601 A | | 6/2020 | |
| WO | WO-2017210452 A1 | * | 12/2017 | G06F 16/435 |
| WO | 2021024029 A1 | | 2/2021 | |

OTHER PUBLICATIONS

Baheti, "Automating an AI to Find Shortest Route Using Reinforcement Learning," Heartbeat.fritz.ai, Mar. 25, 2020 [accessed on Jul. 12, 2021], 10 pages, Retrieved from the Internet: <URL: https://heartbeat.fritz.ai/automating-an-ai-to-find-the-shortest-route-using-reinforcement-learning-19dc9a3c0411>.

Disclosed Anonymously, "Autonomous Guidance Devices," IP.com, Dec. 11, 2017, 6 pages, IP.com No. IPCOM000251915D, Retrieved from the Internet: <URL: https://priorart.ip.com/IPCOM/000251915>.

Disclosed Anonymously, "System and Method for Utilising Citizen Sensing to Provide Route Planning for People with Disabilities," IP.com, Mar. 19, 2014, 4 pages, IP.com No. IPCOM000235672D, Retrieved from the Internet: <URL: https://priorart.ip.com/IPCOM/000235672>.

Imani, "Design and Development of a User Interface for a Mobile Personal Indoor Navigation Assistant for the Elderly," Politecnico di Milano (Polytechnic University of Milan), [thesis], 2013-2014, 107 pages, Retrieved form the Internet: <URL: /1/2014_10_IMANI.pdf >.

Lin, et. al., "Simple Smartphone-Based Guiding System for Visually Impaired People," Sensors [article], Jun. 2017, 22 pages, vol. 17, Issue 1371, DOI: 10.3390/s17061371, Retrieved from the Internet: <URL: https://www.researchgate.net/publication/317584381_Simple_Smartphone-Based_Guiding_System_for_Visually_Impaired_People/link/5941aed0458515a36b573459/download>.

Mell, et al., "The NIST Definition of Cloud Computing", National Institute of Standards and Technology, Special Publication 800-145, Sep. 2011, 7 pages.

Pichler, "Indoor Navigation for the Visually Impaired," Indoo.rs, Aug. 22, 2018 [accessed on Jul. 14, 2021], 7 pages, Retrieved from the Internet: <URL: https://indoo.rs/indoor-navigation-for-the-visually-impaired/>.

Ponchillia, et. al., "Developing an Indoor Navigation Application: Identifying the Needs and Preferences of Users Who Are Visually Impaired," Journal of Visual Impairment & Blindness [article], Sep. 2020, vol. 114, Issue 5, 12 pages, ResearchGate, DOI: 10.1177/0145482X20953279, Retrieved from the Internet: <URL: https://www.researchgate.net/publication/346721108_Developing_an_Indoor_Navigation_Application_Identifying_the_Needs_and_Preferences_of_Users_Who_Are_Visually_Impaired>.

* cited by examiner

PERSONA BASED NAVIGATION AND ROUTE OPTIMIZATION

BACKGROUND

The present invention relates generally to the field of computing, and more particularly to data and analytics.

Existing navigation systems may rely on a utilization of external hardware to facilitate directing a user along a path. The external hardware may include wireless technology transmitters and/or beacons which may send or receive signals to or from (respectively) other nearby devices, among other similarly functioning technology.

SUMMARY

Embodiments of the present invention disclose a method, computer system, and a computer program product for persona-based navigation. The present invention may include creating a persona. The present invention may include developing a routing system. The present invention may include enabling a user with at least one route option based on the created persona. The present invention may include displaying a selected route.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
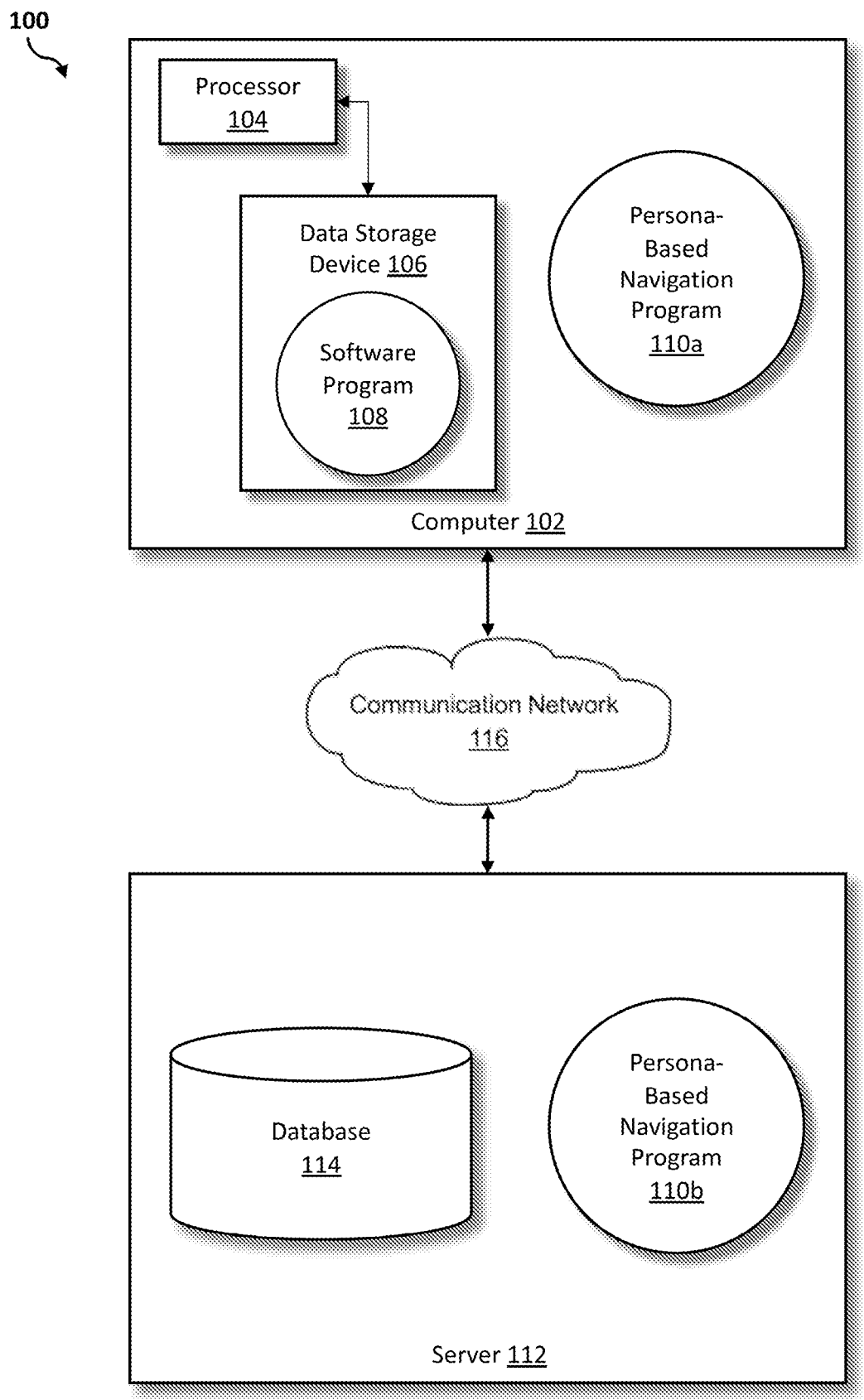
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for persona-based navigation. As such, the present embodiment has the capacity to improve the technical field of data and analytics by utilizing a user-submitted questionnaire to propose at least one route along which a user may travel from a source to a destination. The user-submitted questionnaire may be used to create a persona for the user, which persona may highlight a context and/or an objective for which a route may be used. The at least one proposed route may be suggested based on the persona, any historical data, any feedback and/or a self-learning capability, either alone or in combination. The user may ultimately select the route on which the user wishes to travel, and this selection may be used to update the system's ability to make accurate suggestions in the future. More specifically, the present invention may include creating a persona, developing a routing system, enabling a user with at least one route option based on the created persona, and finally, displaying a selected route.

As described previously, existing navigation systems may rely on a utilization of external hardware to facilitate directing a user along a path. The external hardware may include wireless technology transmitters and/or beacons which may send or receive signals to or from (respectively) other nearby devices, among other similarly functioning technology. The external hardware may include Bluetooth® (Bluetooth and all Bluetooth-based trademarks and logos are trademarks or registered trademarks of Bluetooth SIG, Inc. and/or its affiliates) beacons and/or wi-fi based approaches, among other things. However, existing navigation systems may not provide real-time navigation guidance which may be accessible by the user's own device, and which may be based on a set of user provided information.

Therefore, it may be advantageous to, among other things, create a user persona based on a questionnaire submitted on the user's device, and build a routing model dynamically (e.g., on the fly, instantly responsive to the submitted questionnaire) using the created user persona which provides at least one routing option to a user.

According to at least one embodiment, the present invention may generate insights from historical data and may process a user submitted questionnaire in real-time, using both the historical data and any user submitted responses to create the user persona. After the user persona is created, the routing model may provide multiple routes (where applicable, and in any event will provide one route) along with recommendations which may best fit the created user persona. A user may select from options including, but not limited to, a shortest route, an optimal route, and/or a personalized route, etc., to reach a destination.

According to at least one embodiment, the present invention may create a persona-based navigation system which identifies an optimal path (i.e., a route) between a source and a destination and enables a user with multiple route options based on the created persona. For example, a user who is visually impaired, wheelchair bound, and/or elderly may be provided with route options which take into consideration a physical impairment. Similarly, a user who reports on having back spasms may be provided with a route which avoids walking and utilizes an available elevator, and a user who reports on having a headache may be provided with a route which avoids bright lights and utilizes a shaded path.

According to at least one embodiment, a routing system of the present invention may be built dynamically using recommendations based on the persona, incorporating a feedback mechanism and self-learning capabilities.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a persona-based navigation program 110a. The networked computer environment 100 may also include a server 112 that is enabled to run a persona-based navigation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations regarding the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the persona-based navigation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the persona-based navigation program 110a, 110b (respectively) to propose at least one route along which a user may travel from a source to a destination, based on a user-submitted questionnaire. The user-submitted questionnaire may be used to create a persona for the user, which persona may highlight a context and/or an objective for which a route may be used. The at least one proposed route may be suggested based on the persona, any historical data, any feedback and/or a self-learning capability, either alone or in combination. The user may ultimately select and display the route on which the user wishes to travel, and this selection may be used to update the system's ability to make accurate suggestions in the future. The persona-based navigation method is explained in more detail below with respect to FIGS. 2 and 3.

Figure 2:
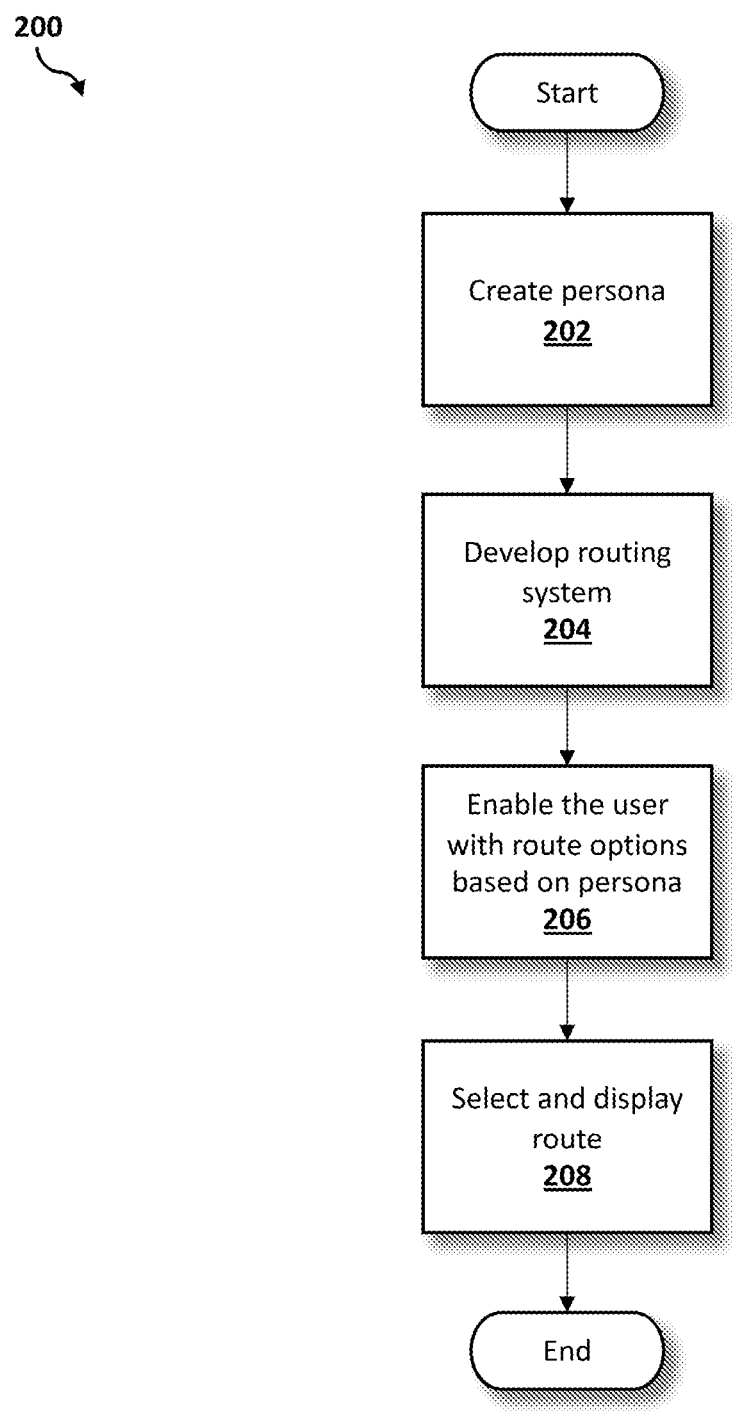
FIG. 2 is an operational flowchart illustrating a process for persona-based navigation according to at least one embodiment.

Referring now to FIG. 2, an operational flowchart illustrating the exemplary persona-based navigation process 200 used by the persona-based navigation program 110a and 110b according to at least one embodiment is depicted.

At 202, a persona is created. The persona-based navigation program 110a, 110b may create a persona of a user in real-time based on a questionnaire (e.g., a dynamic questionnaire which may be completed and updated by a user at any time via an interface on the user's connected device to obtain an updated route based on a source and a destination location of the user) which may capture a context, an objective and/or any preferences of the user which may be used to enable an accurate and an appropriate navigation. The questionnaire may request a user's health information (e.g., age, gender, physical fitness level, among other things which may assist the system in determining an overall health and a fitness ability of the user), a purpose of a visit, and a mobility of the user. A mobility of the user may include an indication as to whether the user will travel by foot, bicycle, wheelchair, vehicle, train, bus, boat, subway, aerial tramway, plane, or otherwise, and/or whether the route traveled by the user may be desired to be a shortest route, a longest route, a scenic route, an indoor route, an outdoor route, a combination of these routes, among other routes.

Consent to access information provided on the questionnaire may be obtained in real-time or through a prior waiver or other process that informs a subject that their data may be captured by appropriate devices or other sensitive personal data may be gathered through any means and that this data may be analyzed by any of the many algorithms that may be implemented herein. A user may opt out of any portion of the persona-based navigation program 110a, 110b at any time.

The questionnaire may also request a geographic location of the user (e.g., to enable the persona-based navigation program 110a, 110b to connect to a weather application which may provide relevant information on determining a potential outdoor route, among other things). Access to the user's geographic location may also be dependent on consent to access the information of the user. Once consent is given to access the geographic location of the user, natural language processing (NLP) techniques may be used with a machine learning model to classify data collected in the user's questionnaire based on a set of trained data. Data may be trained based on a variety of factors, including, a user's locality and/or geographic region, a type of user, a user's physical ability (e.g., including whether the user has any physical limitation and/or a likelihood of the user to perform a physically strenuous activity, among other things) and a type of location, among other factors.

Any machine learning model(s) may be used here to train the data described above to recognize patterns, to learn from the patterns, and to make predictions based on future data. This may include one or more of the following machine learning models employing techniques for regression, classification, clustering, and reinforcement learning: Extreme Gradient Boosting, Deep Q-Learning (DQN), Continuous DQN (CDQN), Random Forest, Gradient Boosting, K means, Naïve Bayes, Recurrent Neural Networks, and/or Decision Trees for self-learning and feedback. In an embodiment, an ensemble machine learning technique may be employed that uses multiple machine learning algorithms together to assure better prediction when compared with the prediction of a single machine learning algorithm. In this embodiment, training data for the model may include user data and past user routes. The training data may be collected from a single user or a group of users, with user consent required prior to the collection of any training data. The classification results may be stored in a database (e.g., database 114) and may be constantly updated. The machine learning model used may be trained to remember a possible route for a given persona (e.g., using data collected based on the user's questionnaire). Based on this training, the machine learning model may be used to generate recommendations based on an identified match (if any) between a determined route and a developed user persona.

At 204, a routing system is developed, and routes are identified between a source and a destination. The routing system may be either graph-based (e.g., a graph-based routing system to identify possible routes between a source node and a destination node, where the source node and the destination node are connected by an edge or link with an associated cost reflective of a physical distance traveled on that link, among other things), machine learning-based (e.g., a machine learning-based system will ingest inputted data and predict a route based on learned patterns) or may be a combination of the two. Both the graph-based and machine learning-based systems may have advantages (e.g., it may be advantageous to consider factors learned by the machine learning-based system while computing a lowest cost route by the graph-based system which spans the least distance) and thus may be used in combination to develop the present routing system (e.g., a routing system may be selected based on a user requirement, such as graph-based for a first-time user and machine learning-based for an existing user who may be able to provide insights based on historical data). In developing the routing system, the persona-based navigation program 110*a*, 110*b* may utilize building plans (e.g., a blueprint, a site plan) and/or an available camera feed, to construct a live view of the area in which the user wishes to travel. The building plans may be ever changing as furniture and people may be moving around both inside and outside of the building and may not be fixtures which may be always accounted for. Thus, the routing system may be developed dynamically (e.g., on the fly, instantly responsive to the user questionnaire) and may identify all possible routes between a source and a destination which may be appropriate for the user based on the submitted questionnaire. To maintain a level of efficiency, the persona-based navigation program 110*a*, 110*b* may eliminate certain possible routes as traveling options for the user, based on responses provided in the user's questionnaire. For example, if the user states in the questionnaire that the user is experiencing back spasms, then the persona-based navigation program 110*a*, 110*b* may eliminate stairs as a routing option and may not identify any routes with stairs for the user. Similarly, if the user states in the questionnaire that the user would like to take a foot path, then the route may include stairs; however, if the user states in the questionnaire that the user is wheelchair-bound, then the route may include ramps.

A developed route may recommend additional stops, based on self-learning and feedback, given the user's source and destination locations, as well as information provided on the user's questionnaire. For example, if a user wishes to visit an orthopedics department in a hospital, the persona-based navigation program 110*a*, 110*b* may recommend visiting an x-ray department on the way to the orthopedics department, based on a learned commonality between people visiting the orthopedics department and first getting an x-ray, and may display same in a proposed route. Similarly, if a user wishes to visit a particular sneaker store in a mall, the persona-based navigation program 110*a*, 110*b* may recommend visiting a sports store first (e.g., based on feedback which discloses that users desiring to visit the sneaker store often purchase from the sports store instead) and may display the recommendation and suggested stops in a proposed route to the sneaker store.

Any routes identified by the persona-based navigation program 110*a*, 110*b* may be dynamically updated based upon an update to the user questionnaire. This is to say that the process for finding an optimal route may be iterative, accommodating new learnings and feedback from users to map the optimal route for a given persona (e.g., each user of the persona-based navigation program 110*a*, 110*b* may have an independent persona which may be based on user-specific details included in the questionnaire).

At 206, a user is enabled with route options based on the created persona. The user may be given an option to select from available routes developed by the persona-based navigation program 110*a*, 110*b* and described previously with respect to step 204 above. The user may provide feedback in the user's connected device (e.g., a mobile device, tablet, or any other device having the ability of connecting to the internet, using an interface which enables communication from a user of the persona-based navigation program 110*a*, 110*b*, among other things, and an NLP technique which analyzes the provided feedback) based on the routes provided by the persona-based navigation program 110*a*, 110*b* which may include approving or disapproving of a provided route for a reason explained by the user. Feedback may also include a reasoning as to why a particular route may not be ideal for a user in the same or a similar position as the user, which information may be used to update the persona-based navigation program 110*a*, 110*b*, as will be described in more detail with respect to step 208 below.

At 208, a route is selected, and the routing system is updated based on user feedback. User feedback may be provided from the user each time a route is either suggested, chosen, and/or completed, or any combination of the above. A machine learning algorithm implemented herein may learn from both the user's feedback and the feedback of another, similar user of the persona-based navigation program 110*a*, 110*b* (e.g., based on user details provided in the user persona, which details may not be divulged to the user based on privacy concerns but may anonymously be used by the persona-based navigation program 110*a*, 110*b* to improve the quality of the system). User feedback may also be feedback from a previously identified route and may not necessarily be feedback relating to the present route selection (e.g., but may divulge information about a like or dislike of the user). Any feedback received by the persona-based navigation program 110*a*, 110*b* may be stored in a connected database (e.g., database 114) for future reference. A route selected by the user here may be considered by the persona-based navigation program 110*a*, 110*b* to be an optimal route for the user given the conditions listed in the questionnaire, and may be used by the persona-based navigation program 110*a*, 110*b* to make future route selection decisions.

According to at least one embodiment, the persona-based navigation program 110*a*, 110*b* uses a ranking system to rank outputted routes in order of most to least optimal. In this case, a route selected by the user may be given a highest rank and may be considered the most optimal route for a similar user with the same conditions as the user. The persona-based navigation program 110*a*, 110*b* may indicate a preferred route and may also enable the user to make a selection of an alternate route (e.g., to choose another of the displayed routes). The user may also choose the preferred route. The ranking of routes may be updated based on selections of other, similar, users of the persona-based navigation program 110*a*, 110*b* at any time (e.g., based on the dynamic nature of the persona-based navigation program 110*a*, 110*b*).

The persona-based navigation program 110*a*, 110*b* may display the available routes for the user on the user's connected Internet of Things (IoT) device, giving the user an option to select a route which may be best suited for the user based on the user's requirements (e.g., based on the details included in the user's questionnaire, as described previously with respect to step 202 above). The persona-based navigation program 110a, 110b may also provide verbal guidance on the user's IoT device, including recommendations and/or preferences based on a user's questionnaire, thereby further personalizing the navigation experience. The visual and/or audio guidance may include recommendations best suited to the user based on collected user data.

Figure 3:
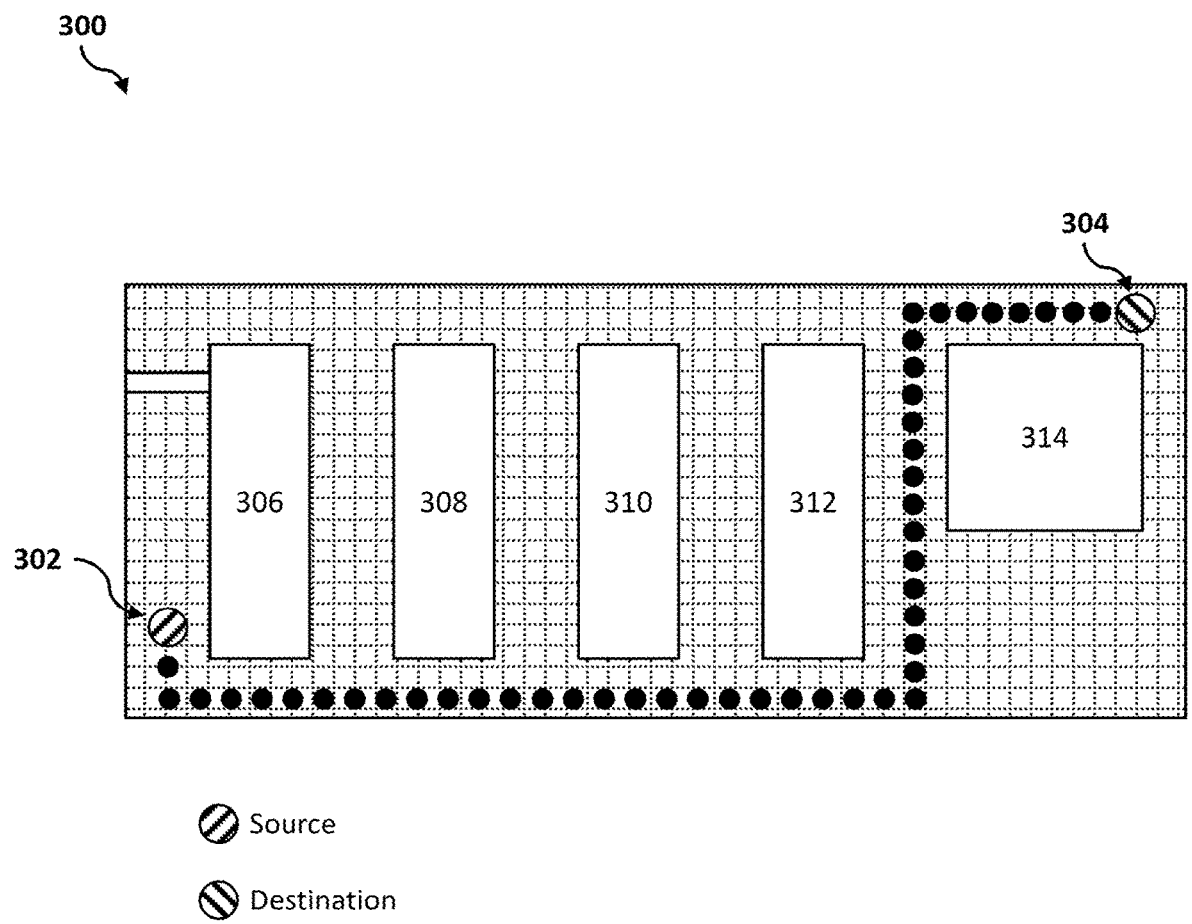
FIG. 3 is a block diagram of the persona-based navigation system according to at least one embodiment.

Referring now to FIG. 3, a block diagram of a persona-based navigation system 300 according to at least one embodiment is depicted. The persona-based navigation program 110a, 110b creates a persona of a user based on a completed questionnaire, as described previously with respect to step 202 above. In this instance the persona-based navigation program 110a, 110b determines the objective of the user is to obtain a walking path from a source 302 to a destination 304 which utilizes an existing path between office cubes 306, 308, 310, 312, and 314. The persona-based navigation program 110a, 110b identifies all possible routes from the source 302 to the destination 304 based on the created persona and maps an optimal route for the user. The map may be depicted for the user on a connected Internet of Things (IoT) device.

It may be appreciated that FIGS. 2 and 3 provide only an illustration of one embodiment and do not imply any limitations about how different embodiments may be implemented. Many modifications to the depicted embodiment(s) may be made based on design and implementation requirements.

Figure 4:
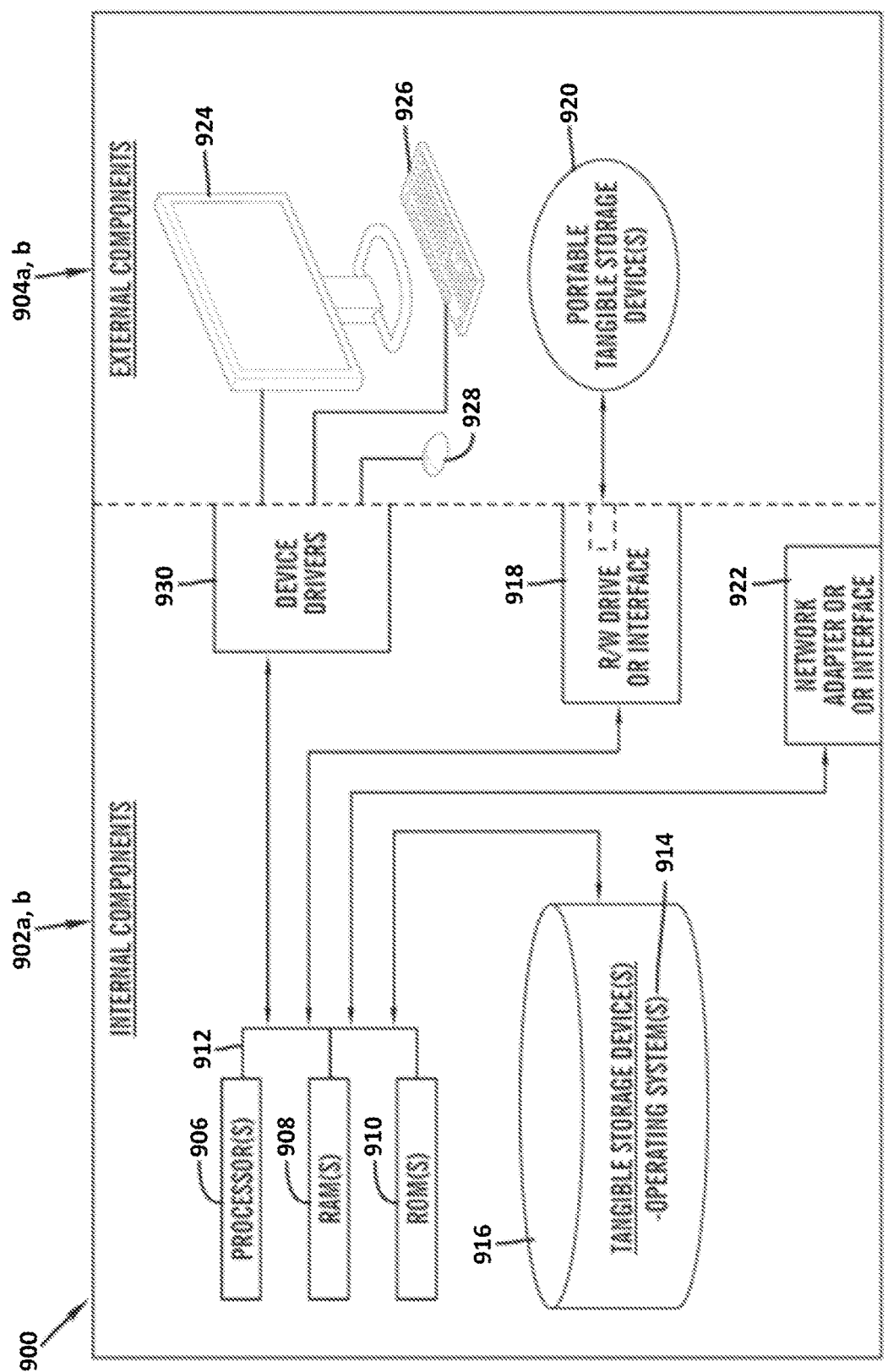
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations about the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the persona-based navigation program 110a in client computer 102, and the persona-based navigation program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk, or semiconductor storage device. A software program, such as the software program 108 and the persona-based navigation program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the persona-based navigation program 110a in client computer 102 and the persona-based navigation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the persona-based navigation program 110a in client computer 102 and the persona-based navigation program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, apart from limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
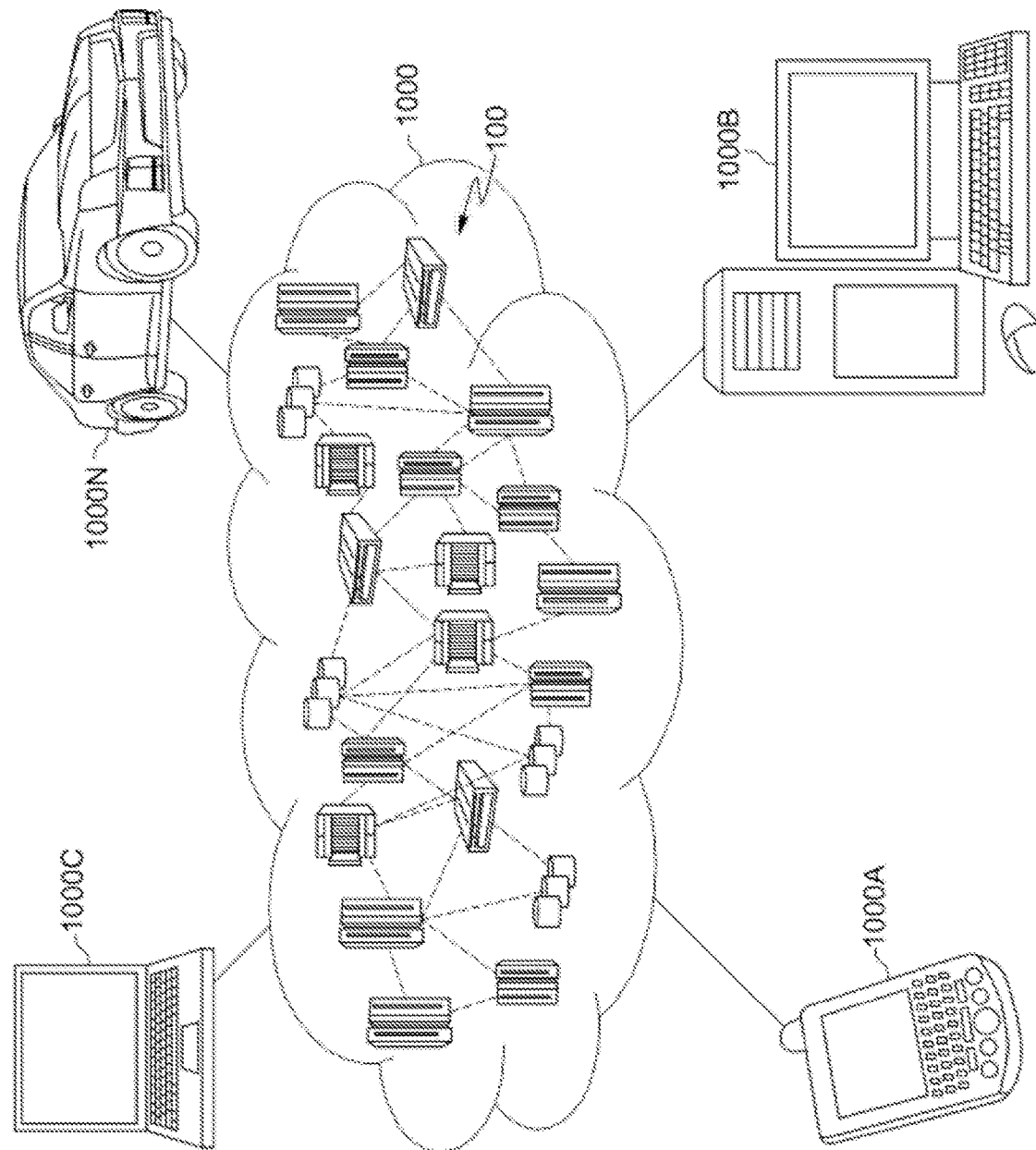
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
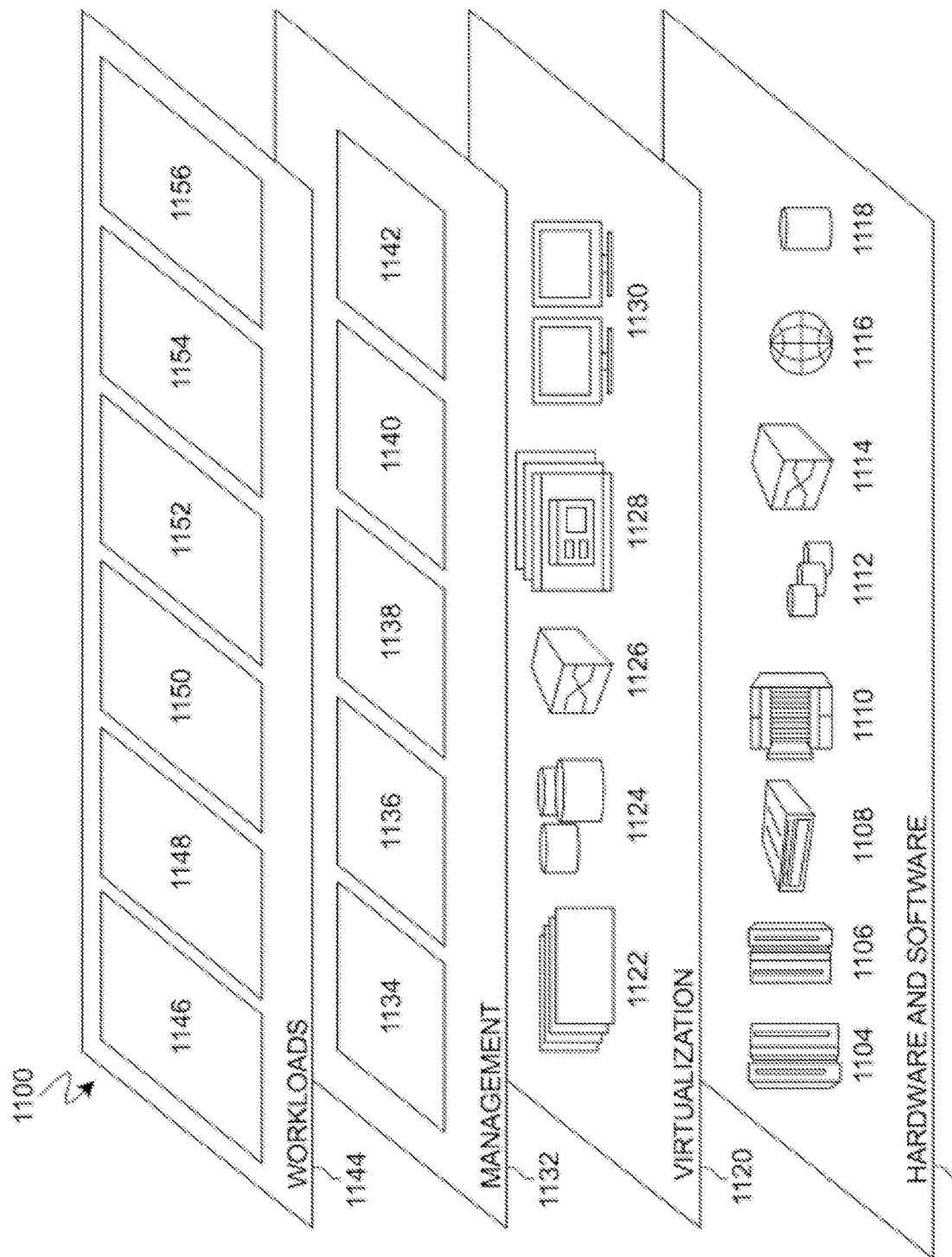
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and persona-based navigation 1156. A persona-based navigation program 110a, 110b provides a way to utilize a user-submitted questionnaire to propose at least one route along which a user may travel from a source to a destination. The user-submitted questionnaire may be used to create a persona for the user, which persona may highlight a context and/or an objective for which a route may be used. The at least one proposed route may be suggested based on the persona, any historical data, any feedback and/or a self-learning capability, either alone or in combination. The user may ultimately select and display the route on which the user wishes to travel, and this selection may be used to update the system's ability to make accurate suggestions in the future.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for persona-based navigation, the method comprising:
    obtaining information about a user by a machine learning component, wherein information includes said user's mobility, user's age, user's ability, user's gender and user's preferences;
    obtaining historical data about said user's previous selections by said machine learning component when available;
        creating a user persona based navigation program using one or more sources and also using obtained information about said user and any obtained historical data about said user by said machine learning component and said user submitted questionnaire in real-time;
    classifying using a machine learning model data collected for said user to navigate from a starting point to a target point based on said user mobility and preferences;
    analyzing classified data, obtained information and historical data using said machine learning component to predict a route identified between said starting point and said target point based on a set of criteria including at least distance, physical condition of said user, user preferences and/or cost of travel a certain route;
    developing a routing system based on analysis performed and by identifying one or more detected patterns provided by a recognition model used by said machine learning component to navigate one or more routes between said starting point and said target point;
    obtaining feedback data about any feedback from a plurality of similarly situation users and with similar mobility and preferences navigating between said starting point and said target point;
    updating said developed route system based on obtained feedback data,
        updating said routing system continuously and dynamically based on changes to said user's persona, and predictions on changes to said route based on determinations made by a machine learning algorithm, wherein said route system provides a plurality of routes when applicable, along with recommendations which best fit said created user persona; and
        generating and presenting to said user with at least one route option based on the developed route system.

2. The method of claim 1, wherein the created persona is based on a dynamic questionnaire.

3. The method of claim 1, wherein the developed routing system is based on a graph.

4. The method of claim 1, wherein the at least one route option includes at least one additional stop for the user, based on self-learning and feedback of said machine learning algorithm and wherein said additional stop does not relate to the navigation route but has to do with one or more needs relating to said user as determined from said obtained information about said user.

5. The method of claim 1, wherein the at least one route option is updated dynamically based on an update to a dynamic questionnaire.

6. The method of claim 1, further comprising:
    updating the developed routing system based on feedback from a user.

7. A computer system for persona-based navigation, comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising: obtaining information about a user by a machine learning component and said user submitted questionnaire in real-time, wherein information includes said user's mobility, user's age, user's ability, user's gender and user's preferences; obtaining historical data about said user's previous selections by said machine learning component when available; creating a persona-based navigation program using one or more sources and also using obtained information about said user and any obtained historical data about said user by said machine learning component; classifying using a machine learning model data collected for said user to navigate from a starting point to a target point based on said user mobility and preferences; analyzing classified data, obtained information and historical data using said machine learning component to predict a route identified between said starting point and said target point based on a set of criteria including at least distance, physical condition of said user, user preferences and/or cost of travel a certain route; developing a routing system based on analysis performed and by identifying one or more detected patterns provided by a recognition model used by said machine learning component to navigate one or more routes between said starting point and said target point; obtaining feedback data about any feedback from a plurality of similarly situation users and with similar mobility and preferences navigating between said starting point and said target point; updating said developed route system based on obtained feedback data; updating said routing system continuously and dynamically based on changes to said user's persona, and predictions on changes to said route based on determinations made by a machine learning algorithm, wherein said route system provides a plurality of routes when applicable, along with recommendations which best fit said created user persona; and generating and presenting to said user with at least one route option based on the developed route system.

8. The computer system of claim 7, wherein the created persona is based on a dynamic questionnaire.

9. The computer system of claim 7, wherein the developed routing system is based on a graph.

10. The computer system of 7, wherein the at least one route option includes at least one additional stop for the user, based on self-learning and feedback of said machine learning algorithm and wherein said additional stop does not relate to the navigation route but has to do with one or more needs relating to said user as determined from said obtained information about said user.

11. The computer system of claim 7, wherein the at least one route option is updated dynamically based on an update to a dynamic questionnaire.

12. The computer system of claim 7, further comprising: updating the developed routing system based on feedback from a user.

13. A computer program product for persona-based navigation, comprising:
one or more non-transitory computer-readable storage media and program instructions stored on at least one of the one or more tangible storage media, the program instructions executable by a processor to cause the processor to perform a method comprising:
obtaining information about a user by a machine learning component, wherein information includes user's mobility, user's age, user's ability, user's gender and said user preferences;
obtaining historical data about said user's previous selections by said machine learning component when available;
creating a persona-based navigation program using one or more sources and also using obtained information about said user and any obtained historical data about said user by said machine learning component;
classifying using a machine learning model data collected for said user to navigate from a starting point to a target point based on said user mobility and preferences;
analyzing classified data, obtained information and historical data using said machine learning component to predict a route identified between said starting point and said target point based on a set of criteria including at least distance, physical condition of said user, user preferences and/or cost of travel a certain route;
developing a routing system based on analysis performed and by identifying one or more detected patterns provided by a recognition model used by said machine learning component to navigate one or more routes between said starting point and said target point;
obtaining feedback data about any feedback from a plurality of similarly situation users and with similar mobility and preferences navigating between said starting point and said target point;
updating said developed route system based on obtained feedback data;
updating said routing system continuously and dynamically based on changes to said user's persona, and predictions on changes to said route based on determinations made by a machine learning algorithm; and
generating and presenting to said user with at least one route option based on the developed route system.

14. The computer program product of claim 13, wherein the created persona is based on a dynamic questionnaire.

15. The computer program product of claim 13, wherein the developed routing system is based on a graph.

16. The computer program product of claim 13, wherein the at least one route option includes at least one additional stop for the user, based on self-learning and feedback of said machine learning algorithm and wherein said additional stop does not relate to the navigation route but has to do with one or more needs relating to said user as determined from said obtained information about said user.

17. The computer program product of claim 13, wherein the at least one route option is updated dynamically based on an update to a dynamic questionnaire.

* * * * *